US00RE36703E

United States Patent [19]

Heitschel et al.

[11] E Patent Number: Re. 36,703

[45] **Reissued Date of Patent: *May 16, 2000**

[54] CODING SYSTEM FOR MULTIPLE TRANSMITTERS AND A SINGLE RECEIVER FOR A GARAGE DOOR OPENER

[75] Inventors: Carl Heitschel, Downers Grove; Colin Willmott, Buffalo Grove; Wayne Schindler, Lisle, all of Ill.

[73] Assignee: The Chamberlain Group, Inc., Elmhurst, Ill.

[ * ] Notice: This patent is subject to a terminal disclaimer.

[21] Appl. No.: 08/700,610

[22] Filed: Aug. 12, 1996

Related U.S. Patent Documents

Reissue of:

[64] Patent No.: 4,750,118
Issued: Jun. 7, 1988
Appl. No.: 06/792,661
Filed: Oct. 29, 1985

U.S. Applications:

[63] Continuation of application No. 08/425,724, Apr. 20, 1995, Pat. No. Re. 35,364, which is a continuation of application No. 08/087,142, Jul. 2, 1993, abandoned, which is a continuation of application No. 07/715,006, Jun. 13, 1991, abandoned, which is a continuation of application No. 07/398,379, Aug. 24, 1989, abandoned, which is a continuation-in-part of application No. 06/615,339, May 30, 1984, Pat. No. 4,638,433.

[51] Int. Cl.[7] ..... G06P 19/00

[52] U.S. Cl. ..... 700/90; 340/825.31; 340/825.69; 340/825.72

[58] Field of Search ..... 340/825.22, 825.3, 340/825.31, 825.04, 825.44, 825.52, 825.53, 825.62, 825.56, 825.57, 825.63, 825.65, 825.69, 825.71, 825.72, 825.73, 825.74, 825.75, 825.76, 539, 542, 543; 341/176; 318/16, 480, 262–266, 282, 466–468; 70/278, 277, 271; 361/171, 172; 49/25, 28, 31, 70, 324; 235/382.5, 382; 364/400, 130, 167.01; 455/186.01, 186.02; 700/90

[56] References Cited

U.S. PATENT DOCUMENTS

| | | | |
|---|---|---|---|
| Re. 29,525 | 1/1978 | Willmott . | |
| 3,337,992 | 8/1967 | Tolson | 340/825.31 |
| 3,579,240 | 5/1971 | Deming . | |

(List continued on next page.)

FOREIGN PATENT DOCUMENTS

| | | |
|---|---|---|
| 099 762 A1 | 2/1984 | European Pat. Off. . |
| 143 309 A2 | 6/1985 | European Pat. Off. . |
| 319 781 A2 | 6/1989 | European Pat. Off. . |

(List continued on next page.)

OTHER PUBLICATIONS

Special Master's Second Amended Report and Recommendation on Plaintiffs' Motion for Summary Judgment of Patent Invalidity under 35 U.S.C. §103, filed Jan. 16, 1998, and Exhibit 1–3 thereto.

Special Master's Report and Recommendation on Plaintiffs' Motions for Summary Judgment of Non–infringement and Defendant's Cross–Motion for Summary Judgment of Infringement, filed Jan. 8, 1998, and Exhibits 1 and 3–9 thereto.

Special Master's Report and Recommendation on Plaintiffs' Motion for Partial Summary Judgment of Patent Invalidity under 35 U.S.C. §251, filed Dec. 10, 1997, and Exhibits 1–11 thereto.

(List continued on next page.)

*Primary Examiner*—Edwin C. Holloway, III
*Attorney, Agent, or Firm*—Fitch, Even, Tabin & Flannery

[57] ABSTRACT

The present invention comprises a system for remote control of garage doors and other devices wherein an extremely large number of codes are available for remote transmitters for operating the garage operator and wherein each transmitter has its own unique and permanent nonuser changeable code. The receiver at the garage door operator is capable of storing and remembering a number of different codes corresponding to different transmitters such that the receiver can be programmed so as to actuated by more than one transmitted code thus allowing two or more transmitters to actuate the same garage door operator and wherein the receiver stores the valid codes for the different transmitters.

26 Claims, 3 Drawing Sheets

U.S. PATENT DOCUMENTS

| | | | |
|---|---|---|---|
| 3,716,865 | 2/1973 | Willmott | 343/225 |
| 3,893,121 | 7/1975 | Ringer | 343/225 |
| 3,898,582 | 8/1975 | Deming | 331/75 |
| 3,906,348 | 9/1975 | Willmott . | |
| 3,911,397 | 10/1975 | Freeny, Jr. . | |
| 3,936,833 | 2/1976 | Bush | 343/225 |
| 4,037,201 | 7/1977 | Willmott . | |
| 4,063,410 | 12/1977 | Welling | 58/38 R |
| 4,066,964 | 1/1978 | Costanza et al. . | |
| 4,081,747 | 3/1978 | Meyerle . | |
| 4,103,238 | 7/1978 | Deming et al. . | |
| 4,119,896 | 10/1978 | Estes, III et al. | 318/266 |
| 4,130,738 | 12/1978 | Sandstedt . | |
| 4,141,010 | 2/1979 | Umpleby et al. | 343/225 |
| 4,178,549 | 12/1979 | Ledenbach et al. . | |
| 4,241,540 | 12/1980 | Depperman | 49/199 |
| 4,241,870 | 12/1980 | Marcus | 296/37.7 |
| 4,263,536 | 4/1981 | Lee et al. | 318/266 |
| 4,286,262 | 8/1981 | Wahl . | |
| 4,291,411 | 9/1981 | Müller et al. | 455/88 |
| 4,305,060 | 12/1981 | Apple et al. . | |
| 4,315,249 | 2/1982 | Apple et al. | 340/825.52 |
| 4,322,855 | 3/1982 | Mogi et al. . | |
| 4,328,540 | 5/1982 | Matsuoka et al. | 364/167 |
| 4,360,801 | 11/1982 | Duhame | 340/521 |
| 4,366,482 | 12/1982 | Remes et al. | 340/825.69 |
| 4,380,762 | 4/1983 | Capasso | 340/825.63 |
| 4,385,296 | 5/1983 | Tsubaki et al. . | |
| 4,396,481 | 8/1983 | Early | 361/172 |
| 4,404,558 | 9/1983 | Yen | 340/825.72 |
| 4,405,923 | 9/1983 | Matsuoka et al. | 340/825.56 |
| 4,417,247 | 11/1983 | Dressler | 340/825.31 |
| 4,418,333 | 11/1983 | Schwarzbach et al. . | |
| 4,422,071 | 12/1983 | DeGraff | 340/825.44 |
| 4,426,637 | 1/1984 | Apple et al. | 340/825.65 |
| 4,447,808 | 5/1984 | Marcus . | |
| 4,453,269 | 6/1984 | Skar | 455/129 |
| 4,454,509 | 6/1984 | Buennagel et al. | 340/825.69 |
| 4,464,651 | 8/1984 | Duhame . | |
| 4,483,683 | 11/1984 | Alley, Sr. | 441/69 |
| 4,485,382 | 11/1984 | Moore | 340/825.69 |
| 4,491,774 | 1/1985 | Schmitz . | |
| 4,496,942 | 1/1985 | Matsuoka . | |
| 4,499,464 | 2/1985 | Knox et al. | 340/825.72 |
| 4,509,093 | 4/1985 | Stellberger | 361/172 |
| 4,529,980 | 7/1985 | Liotine . | |
| 4,535,333 | 8/1985 | Twardowski | 340/825.69 |
| 4,536,747 | 8/1985 | Jensen | 340/502 |
| 4,550,311 | 10/1985 | Galloway et al. | 340/531 |
| 4,573,046 | 2/1986 | Pinnow | 340/825.56 |
| 4,574,247 | 3/1986 | Jacob | 329/126 |
| 4,581,606 | 4/1986 | Mallory . | |
| 4,593,412 | 6/1986 | Jacob | 455/129 |
| 4,596,985 | 6/1986 | Bongard et al. | 340/825.69 |
| 4,602,246 | 7/1986 | Jensen | 340/521 |
| 4,602,357 | 7/1986 | Yang et al. . | |
| 4,633,247 | 12/1986 | Hegeler | 340/825.69 |
| 4,638,433 | 1/1987 | Schindler | 364/400 |
| 4,638,496 | 1/1987 | Jensen . | |
| 4,646,072 | 2/1987 | Hughes . | |
| 4,652,860 | 3/1987 | Weishaupt et al. | 340/539 |
| 4,653,565 | 3/1987 | Iha et al. | 160/193 |
| 4,654,745 | 3/1987 | Corby | 361/171 |
| 4,665,397 | 5/1987 | Pinnow | 340/825.56 |
| 4,670,739 | 6/1987 | Kelly, Jr. | 340/539 |
| 4,692,762 | 9/1987 | Lewiner et al. | 340/825.69 |
| 4,709,412 | 11/1987 | Seymour et al. . | |
| 4,722,625 | 2/1988 | O'Brien | 401/6 |
| 4,737,770 | 4/1988 | Brunius et al. | 340/539 |
| 4,750,118 | 6/1988 | Heitschel et al. | 364/400 |
| 4,754,255 | 6/1988 | Sanders et al. . | |
| 4,755,792 | 7/1988 | Pezzolo et al. | 340/538 |
| 4,758,835 | 7/1988 | Rathmann et al. | 340/825.31 |
| 4,794,622 | 12/1988 | Isaacman et al. . | |
| 4,806,929 | 2/1989 | Nishijima et al. | 340/825 |
| 4,808,995 | 2/1989 | Clark et al. | 340/825.69 |
| 4,825,200 | 4/1989 | Evans et al. | 341/23 |
| 4,843,337 | 6/1989 | Conn, Jr. et al. | 340/906 |
| 4,847,542 | 7/1989 | Clark et al. | 318/560 |
| 4,847,601 | 7/1989 | Conti | 341/176 |
| 4,853,524 | 8/1989 | Yamaguchi et al. | 235/468 |
| 4,855,713 | 8/1989 | Brunius | 340/506 |
| 4,864,588 | 9/1989 | Simpson et al. . | |
| 4,866,434 | 9/1989 | Keenan | 340/825.72 |
| 4,868,559 | 9/1989 | Pinnow | 340/825.31 |
| 4,872,082 | 10/1989 | Martel | 361/179 |
| 4,878,052 | 10/1989 | Schulze | 340/825.69 |
| 4,890,108 | 12/1989 | Drori et al. | 341/176 |
| 4,896,353 | 1/1990 | Dehgani et al. | 341/75 |
| 4,897,652 | 1/1990 | Leon | 341/51 |
| 4,912,463 | 3/1990 | Li | 340/825.69 |
| 4,912,525 | 3/1990 | Pinnow . | |
| 4,918,439 | 4/1990 | Wozniak et al. | 340/825.69 |
| 4,931,789 | 6/1990 | Pinnow | 340/825.56 |
| 4,932,037 | 6/1990 | Simpson et al. . | |
| 4,951,029 | 8/1990 | Severson | 340/506 |
| 4,963,876 | 10/1990 | Sanders et al. | 341/176 |
| 4,988,992 | 1/1991 | Heitschel et al. | 340/825.69 |
| 4,995,053 | 2/1991 | Simpson et al. . | |
| 5,049,867 | 9/1991 | Stouffer | 340/426 |
| 5,140,171 | 8/1992 | de Janasz | 307/10.8 |
| 5,148,159 | 9/1992 | Clark et al. | 340/825.22 |
| 5,184,132 | 2/1993 | Baird | 341/176 |
| 5,220,319 | 6/1993 | Kendel | 340/825.69 |
| 5,252,960 | 10/1993 | Duhame | 340/825.56 |
| 5,252,966 | 10/1993 | Lambropoulos et al. | 340/825.69 |
| 5,343,500 | 8/1994 | Betts et al. . | |

FOREIGN PATENT DOCUMENTS

| | | |
|---|---|---|
| 401 673 A1 | 12/1990 | European Pat. Off. . |
| 561 361 A1 | 9/1993 | European Pat. Off. . |
| 563 517 A1 | 10/1993 | European Pat. Off. . |
| 212 050 A3 | 3/1997 | European Pat. Off. . |
| 27 46 532 A1 | 4/1979 | Germany . |
| 28 56 337 A1 | 7/1980 | Germany . |
| 29 39 589 A1 | 4/1981 | Germany . |
| 29 41 394 A1 | 4/1981 | Germany . |
| 37 41 324 C2 | 6/1989 | Germany . |
| 39 18 131 C2 | 3/1991 | Germany . |
| 55-114771 | of 1980 | Japan . |
| 55-20830 | 2/1980 | Japan . |
| 59-80872 | of 1984 | Japan . |
| 1 423 126 | 9/1974 | United Kingdom . |

OTHER PUBLICATIONS

"Garagentorantrieb mit Funkfernsteuerung," by Torsten Meyer–Staufenbiel, pp. 115–117, dated 1975.

Alltronik Opposition Brief of Jul. 8, 1990, corresponding to German Patent No. 36 25 555.

Dorma Opposition Brief of Aug. 8, 1990 of corresponding German Patent No. 36 25 555.

Reply Brief for Appellant's, The Chamberlain Group, Inc., in Overhead Door Corporation and GMI Holdings, Inc. v. The Chamberlain Group, Inc. Appeal No. 98–1428.

Opinion announcing Judgment of the Court in the Overhead Door Corporation Appeal.

Errata Sheet for that Opinion.

Plaintiffs' Brief filed in *Overhead Door Corporation & GMI Holdings Inc., v. the Chamberlain Group, Inc.* Appeal No. 98–1428; Appeal from the United States District Court for the Northern District of Texas in 95–CV–1648 in the United States District Court of Appeals for the Federal Circuit. Appeal Brief dated Oct. 8, 1998.

Defendant's Brief filed in *Overhead Door Corporation & GMI Holdings Inc., v. the Chamberlain Group, Inc.* Appeal No. 98–1428; Appeal from the United States District Court for the Northern District of Texas in 95–CV–1648 in the United States District Court of Appeals for the Federal Circuit. Appeal Brief dated Aug. 24, 1998.

Installation and Operation Manual SS–32 Supervised Security System, 1984.

IEEE Standard Dictionary of Electrical and Electronic Terms, Second Edition, Frank Jay, Editor–in–Chief, Wiley–Interscience, 1977, pp. 324–325, 377–378, 384, 500 and 694.

Plaintiffs' Supplemental Notice Pursuant to 35 U.S.C. § 282 in Overhead Door et al. v. The Chamberlain Group Inc., Civil Action 3:95–CV–1648–D.

Order of Apr. 30, 1998 in Overhead Door.

Second Amended Complaint for Declaratory Judgment, filed Feb. 17, 1998, and Exhibits A–G thereto.

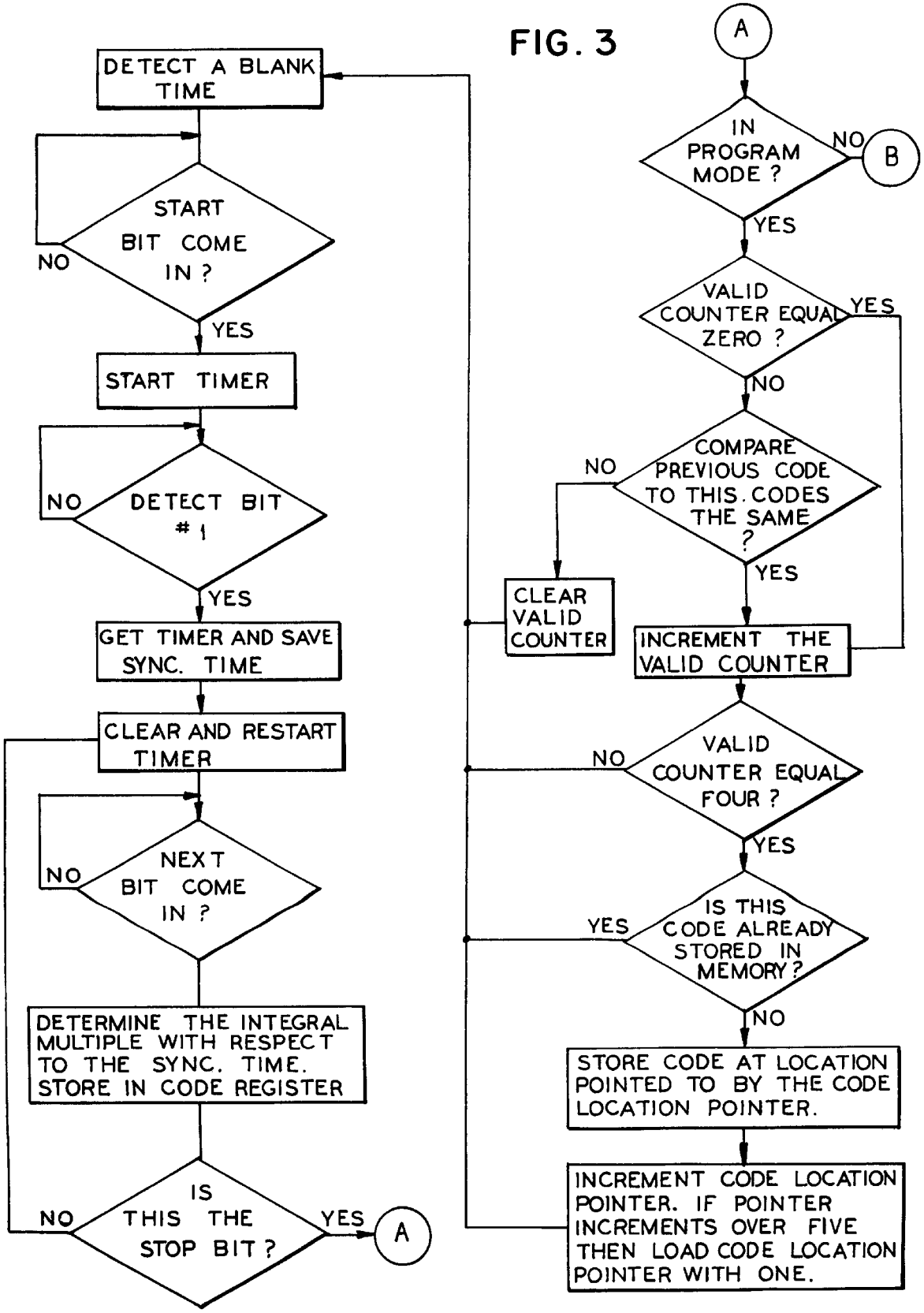
FIG. 3
DETECT A BLANK TIME
START BIT COME IN ?
NO
YES
START TIMER
DETECT BIT #1
NO
YES
GET TIMER AND SAVE SYNC. TIME
CLEAR AND RESTART TIMER
NEXT BIT COME IN ?
NO
DETERMINE THE INTEGRAL MULTIPLE WITH RESPECT TO THE SYNC. TIME. STORE IN CODE REGISTER
IS THIS THE STOP BIT ?
NO
YES
A
A
IN PROGRAM MODE ?
NO
B
YES
VALID COUNTER EQUAL ZERO ?
YES
NO
COMPARE PREVIOUS CODE TO THIS. CODES THE SAME ?
NO
YES
CLEAR VALID COUNTER
INCREMENT THE VALID COUNTER
VALID COUNTER EQUAL FOUR ?
NO
YES
IS THIS CODE ALREADY STORED IN MEMORY ?
YES
NO
STORE CODE AT LOCATION POINTED TO BY THE CODE LOCATION POINTER.
INCREMENT CODE LOCATION POINTER. IF POINTER INCREMENTS OVER FIVE THEN LOAD CODE LOCATION POINTER WITH ONE.

CODING SYSTEM FOR MULTIPLE TRANSMITTERS AND A SINGLE RECEIVER FOR A GARAGE DOOR OPENER

Matter enclosed in heavy brackets [ ] appears in the original patent but forms no part of this reissue specification; matter printed in italics indicates the additions made by reissue.

CROSS-REFERENCES TO RELATED APPLICATIONS

[This application comprises an improvement on application Ser. No. 615,339, filed May 30, 1984, U.S. Pat. No. 4,638,433, in which the inventor is Wayne R. Schindler assigned to the assignee of the present application.] *This application is a continuation of application Ser. No. 425,724 filed Apr. 20, 1995, now U.S. Pat. No. RE 35,364, Oct. 29, 1996, which is a continuation of Ser. No. 87,142, Jul. 2, 1993, abandoned, which is a continuation of Ser. No. 715,006, Jun. 13, 1991, abandoned, which is a continuation of Ser. No. 398,379, Aug. 24, 1989, abandoned, which is a reissue application of Ser. No. 06/792,661 now U.S. Pat. No. 4,750,118, which is a continuation-in-part of application Ser. No. 615,339 filed May 30, 1984, now U.S. Pat. No. 4,638,433. Both Ser. Nos. 08/425,725 and 08/700,610 are reissues of Ser. No. 06/792,661 now U.S. Pat. No. 4,750,188.*

BACKGROUND OF THE INVENTION

1. Field of the Invention

This invention relates in general to garage door operators and in particular to a novel garage door operator wherein the receiver can be energized by two or more transmitted codes which are stored in the receiver.

2. Description of the Prior Art

Garage door operators of the prior art used transmitters in which the code can be changed by various methods as, for example, by moving two position switches to change the code. Such systems have also used code changing switches in the receiver so that the receivers can be set to correspond to the selected transmitter code.

It has also been known to use fixed frequency transmitters and fixed frequency receivers such that if the transmitted frequency matches the receiver frequency the receiver will respond.

SUMMARY OF THE INVENTION

It is an object of the present invention to provide a plurality of transmitters wherein each transmitter has its own unique and permanent non-user changeable code and wherein the receiver can be placed into a program mode wherein it will receive and store two or more codes corresponding to two different transmitters. The number of codes which can be stored in transmitters can be extremely high as, for example, greater than one million codes. Thus, the invention makes it possible to eliminate the requirements for code selection switches in the transmitters.

In the present invention the decoder module in the receiver will be capable of learning several different transmitted codes which will eliminate code switches in the receiver and also provides for multiple transmitters for actuating the garage opener.

The communication link can be various system such as radio frequency, light, wires, etc.

The invention makes it very easy for the user to operate the system and more secured code systems are available due to the higher number of available codes.

An encoded signal will be utilized wherein a pulse and blank time comprises a sync time base and different link pulses such as 1, 2, 3 or 4 milliseconds can be selected so as to provide different codings. Each datum can be 1, 2, 3 or 4 times the length of the sync pulse. The timing is from the rising edge to rising edges of the pulse and with ten data bits the number of codes can be in excess of one million codes.

In the invention, each transmitter encoder will contain a chip which contains a unique code and the receiver will be able to memorize two or more as, for example, five different transmitter codes. This eliminates the need to have coding switches in either the transmitter or receiver. This eliminates the requirement that the user set the code switches so they match since the code switches are eliminated.

In the invention, during an operate mode, a receiver code must match an already programmed code four times in order to operate the garage door. This match is referred to as a valid code. Each valid code can be separated by up to two error codes and still have the output indicated as accurate.

In the program mode a code must be received four times in a row in order to be permanently stored in the receiver. Any error code will reset the valid code counter.

The advantage of the coding scheme are:

1. Higher peak power without exceeding the FCC rules which gives longer transmitter range.

2. Eliminate code switches in the transmitter and receiver making it easier for a customer to install and operate his garage door operator.

3. Customers having more than one transmitter will not have to match codes.

4. More secure codes due to the higher number of combinations which are available. Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure and in which:

BRIEF DESCRIPTION OF THE DRAWINGS

FIG. 3 comprises a flow diagram;

DESCRIPTION OF THE PREFERRED EMBODIMENTS

Figure 1:
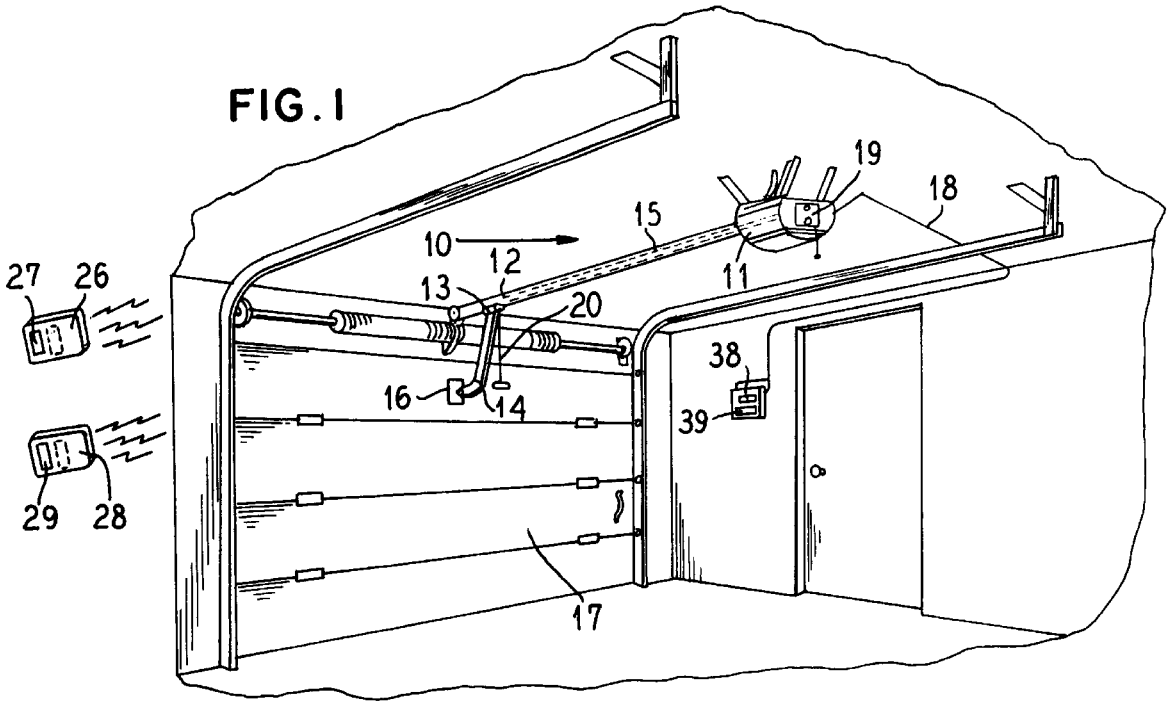
FIG. 1 is a perspective view illustrating a garage door operator.

FIG. 1 illustrates a garage door operator 10 mounted to the ceiling of a garage and connected to operate a door 17. Garage door operator 10 has a head unit 11 which is supported from the ceiling which includes a motor which drives a suitable chain to which a trolley 13 is attached so that it moves along a rail 12. The trolley 13 has a release cord 20 and pivotally carries a lever arm 14 which is attached to a bracket 16 mounted to the door so as to raise and open it by pulling it along conventional rails.

The header unit 11 includes a receiver and operating mechanism and can be actuated from a control unit 38 which has a operate switch 39.

The garage door operator can also be operated by the transmitters 26 and 28 which have operate transmit buttons 27 and 29, respectively.

Figure 2:
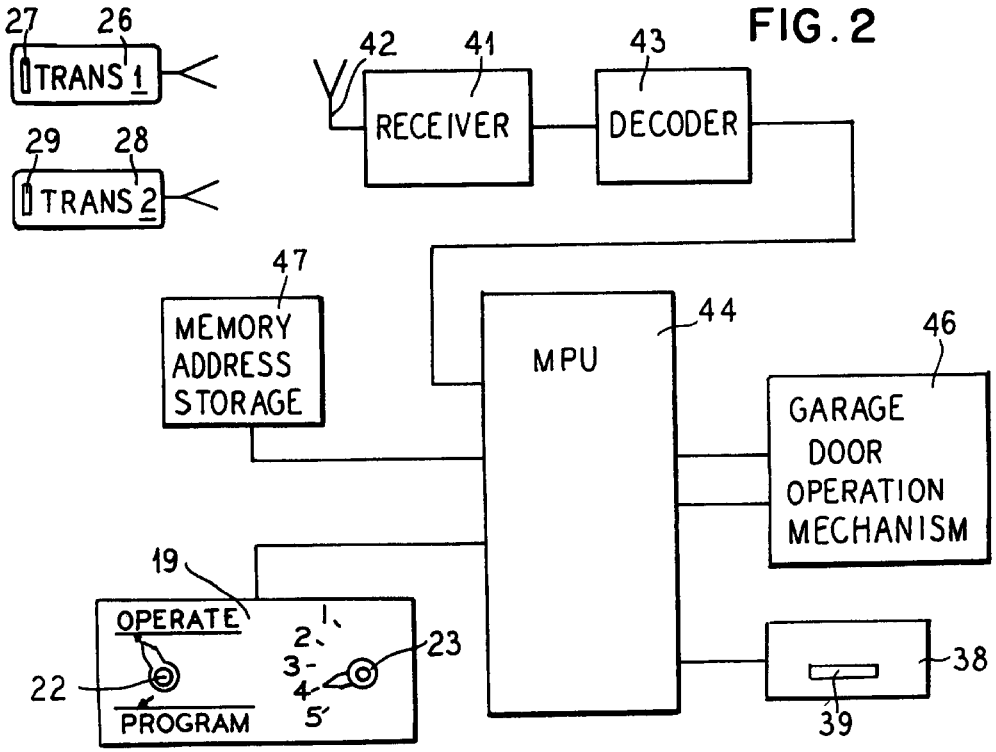
FIG. 2 illustrates in block form the invention.

As illustrated in FIG. 2 the garage door operator includes a receiver 41 which has a suitable antenna 42 for receiving radio frequency transmissions from the transmitters 26 and 28 and supplies an input to a decoder 43 which provides an output to a microprocessor unit 44. The microprocessor unit 44 is connected to a garage door operator mechanism 46 which includes the motor which drives the chain 15 to move the door 17 in a conventional manner. The control 38 is connected to the microprocessor 44. A pair of switches 22 and 23 are mounted on a switch unit 19 connected to the unit 11 and also to the microprocessor 44. The switch 22 is a two position switch that can be moved between the operate and program positions to establish the "operate" and "program" modes. The switch 23 can be moved to a number of selected positions indicated by the 1 through 5 so as to allow the particular code of a number of different transmitters to be stored in the receiver so that the receiver will respond to such codes.

Figure 5:
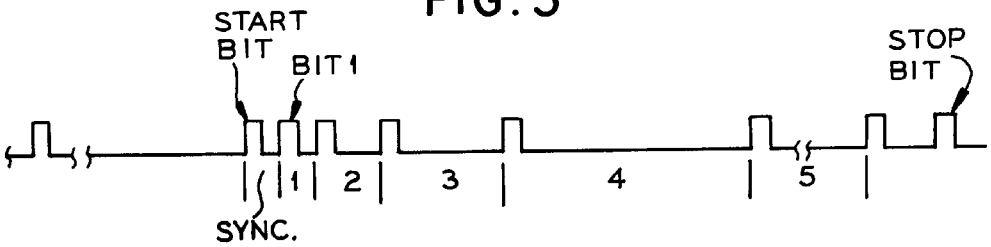
FIG. 5 illustrates the coding scheme.

In the illustrated embodiment, the receiving unit can respond to up to five different transmitters which have five different transmitting codes. FIG. 5 illustrates the code utilized in which the bit times are nominally 0.5 milliseconds for example. The data times are nominally 1, 2, 3 or 4 milliseconds.

The sync pulse is a unit measure of time. Each datum is measured with respect to the sync pulse and each datum can be 1, 2, 3 or 4 times the length of the sync pulse. The timing is from the riding edge to rising edge of adjacent pulses. Using 10 data bits the number of codes which is available is in excess of one million codes.

In the invention, each transmitter such as transmitters 26 and 28 will have a unique code which is determined by the encoder chip contained in the transmitter. The receiver unit will be able to memorize and store a number of different codes as, for example, five different transmitter codes which eliminate the need of coding switches in either the transmitter or receiver which are used in the prior art. This also eliminates the requirement that the user match the transmitter and receiver code switches.

When the garage door operator is initially installed, the switch 22 is moved to the program mode and the energize button 27 of the first transmitter 26 is depressed so that the unique code of the transmitter 26 is transmitted. This is received by the receiver 41 and decoded by the decoder 43 and supplied to the microprocessor unit 44. The switch 23 is placed in the first position and with the switch 22 in the program mode the code of the transmitter 26 will be supplied to the memory address storage 47 and stored therein. Then if the switch 22 is moved to the operate mode and the transmitter 26 energized by depressing the transmit switch 27, the receiver 41, decoder and the microprocessor 44 will compare the received code with the code of the transmitter 26 stored in the first memory location in the memory address storage 47 and since the stored memory address for the transmitter 26 coincides with the transmitted code of the transmitter 26 the microprocessor 44 will energize the garage door operation mechanism 46 to open or close the door.

In order to store the code of the second transmitter 28 the switch 22 is moved again to the program mode and the switch 23 to the second position and the transmitter 28 is energized by depressing its transmit switch 29. This causes the receiver 41 and decoder 43 to decode the transmitted signal and supply it to the microprocessor 44 which then supplies the coded signal of the transmitter 28 to the memory address storage 47 where it is stored in a second address storage location. Then the switch 22 is moved to the operate position and when either of the transmitters 26 and 28 are energized, the receiver 41 decoder 43 and microprocessor 44 will energize the garage door operation mechanism 46 to cause the door to either move up or down depending upon its initial position. Thus, the codes of the transmitters 26 and 28 are transmitted and stored in the memory address storage 47 during the program mode after which the garage door operation mechanism will respond to either of the transmitters 26 and 28. Any desired number of transmitters can be programmed to operate the garage door mechanism as, for example, up to five transmitters can be programmed into the memory address storage 47 by using the program switch 22 and the selector switch 23.

This invention eliminates the requirement that binary switches be set in the transmitter or receiver as is done in systems of the prior art to establish a code to which the receiver will respond and the invention also allows a garage door operator to respond to a number of different transmitters because the specific codes of a number of the transmitters is stored and retained in the memory address storage 47 of this unit.

Figure 4:
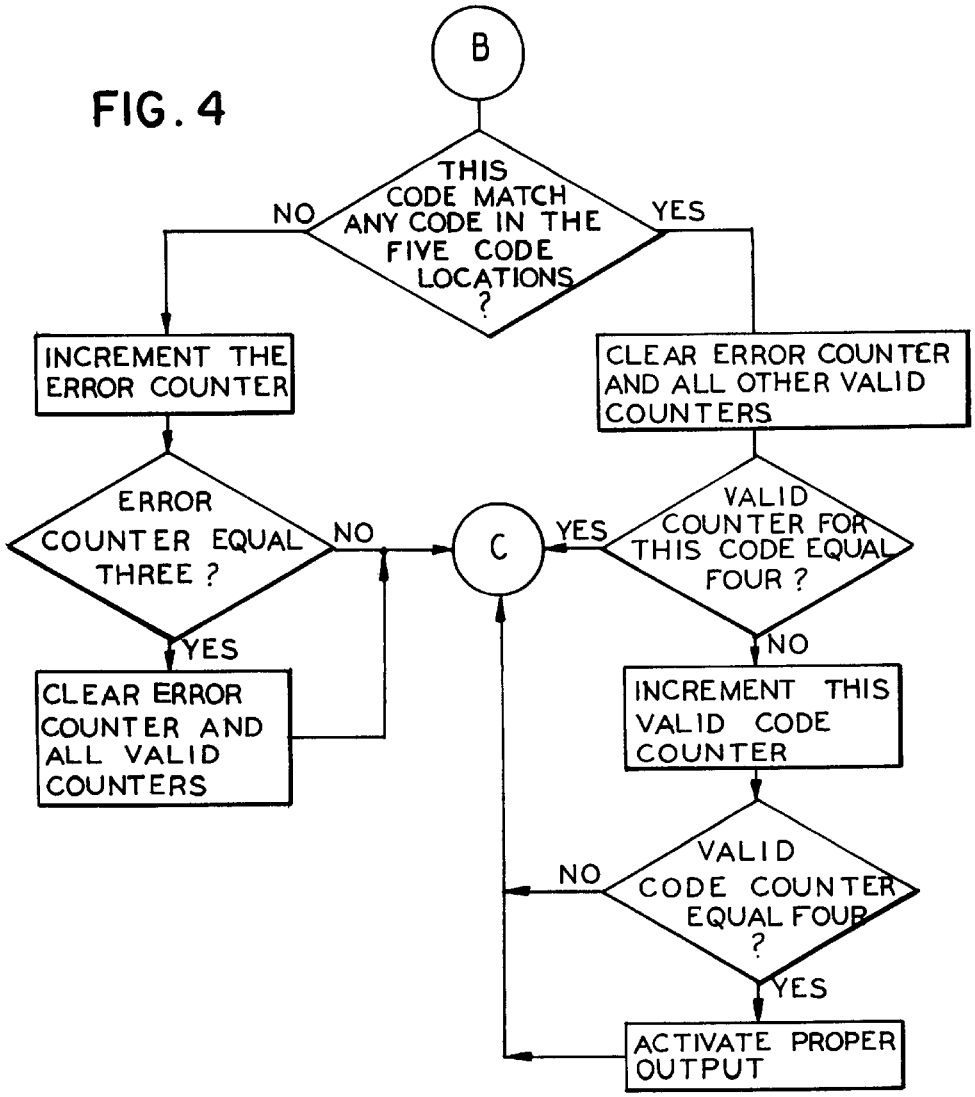
FIG. 4 is a continuation of the flow diagram.

FIGS. 3 and 4 comprise the flow chart which describe both the operate and program modes of the invention. Basically, in the operate mode, a received code must match a program which has already been programmed and for four times so as to operate the garage door. This match is referred to as a valid code in the flow chart. Each valid code can be separated by up to two error codes and still have the output actuate. For example, a code of valid-error-error-valid-valid-valid would actuate the door. On the other hand, a code of valid-valid-valid-error-error-error-valid would not actuate the door.

In the program mode a code must be received four times in a row in order to be permanently stored. Any error code will reset the valid code counter.

With reference to the flow diagrams of FIGS. 3 and 4 if it be assumed initially that the switch 22 is in the operate position an incoming signal will be supplied to terminal A in FIG. 3 and an output will be supplied to terminal B which indicates that the switch 22 is not in the program mode but in the operate mode. Terminal B is illustrated in FIG. 4 and the microprocessor compares the incoming code with any codes in the five code locations stored in the memory address storage 47. If these codes match then the error counter is cleared and all other valid counters. If the valid counter receives the code four times [than] *then* output is supplied to the terminal C which operates the garage door operator. If the valid counter for the code equals less than 4, then the valid code counter is incremented until the valid code counter does equal 4 which actuates the proper output. Relative to FIG. 4 if the input code does not match any of the five stored codes, then the error counter is incremented and when the error counter equals 3 the error counter is cleared and all valid counters are cleared.

If the switch 22 is in the program mode as shown in FIG. 3 when the incoming signal from a transmitter is received, the flow diagram is followed so as to store the new incoming program in the code location pointed to by the code location pointer [23]. It is to be noted that up to five addresses can be stored in the system of the invention.

It is seen that the present invention allows a receiving system to respond to one of a plurality of transmitters which have different unique codes which can be stored in the receiver during a program mode. Each time the "program mode switch" 22 is moved to the program position, a different storage area as determined by the switch 23 can be connected so that the new transmitter code would be stored in that address. After all of the address storage capacity have been used additional codes would erase all old codes in the memory address storage before storing a new one.

Although the invention has been described with respect to preferred embodiments, it is not to be so limited as changes and modifications may be made which are within the full intended scope as defined by the appended claims.

We claim as our invention:

[1. A garage door operator for a garage door comprising, a garage door operation mechanism with an output shaft connected to said garage door to open and close it, a radio receiver, a decoder connected to receive the output of said radio receiver, a microprocessor connected to receive the output of said decoder and to said garage door operation mechanism to energize it, a switch moveable between program and operate positions connected to said microprocessor to place said microprocessor in the operate or the program mode, a memory means for storing a plurality of addresses connected to said microprocessor when said switch is in the program position, a memory selection switch connected to said microprocessor, a plurality of radio transmitters with different codes, said memory selection switch setable in a first position at a time when a first one of said radio transmitters is energized so that the code of said first transmitter will be stored in said memory means and said memory selection switch setable in a second position at a time when a second one of said radio transmitters is energized so that the code of said second transmitter will be stored in said memory means, and said microprocessor placed in the operate mode when said switch is in the operate position so that either or both of said first and second radio transmitters when energized cause said microprocessor to energize said garage door operator mechanism.]

[2. A garage door operator for a garage door according to claim 1 wherein said first and second radio transmitters when energized radiate coded signals and said microprocessor receives and compares coded signals from said first and second transmitters with coded signals stored in said memory means and said microprocessor produces a garage door operate signal if the received transmitted signal and any one of said coded signals stored in said memory means match.]

[3. A garage door operator according to claim 2 wherein said memory selection switch has "n" positions where "n" is an integer and the codes of "n" transmitters can be stored in said memory means when said switch is in the program mode.]

[4. A garage door operator according to claim 3 wherein the code stored in said memory means can be changed by placing said switch in the program mode and one of said plurality of transmitters is energized which has a code which differs from the code previously stored in said memory means.]

*5. An operator for controlling a position of a barrier comprising:*

*at least one radio frequency transmitter having a non-user changeable code for radio frequency transmitting a radio frequency transmission corresponding to the transmitter*

*a radio frequency receiver for being adapted to receive the first-mentioned radio frequency transmission from the first-mentioned radio frequency transmitter and being adapted to receive a second radio frequency transmission from a second radio frequency transmitter having a second non-user changeable code, different from said first non-user changeable code;*

*a program mode designator for designating a program mode;*

*a memory comprising a plurality of storage locations;*

*a processor having a processor controlled code location pointer and responsive to a program mode designation by said program mode designator and the reception by said radio frequency receiver of said first-mentioned radio frequency transmission for storing a first stored code corresponding to the first-mentioned radio frequency transmitter in one of said plurality of storage locations derived from the processor controlled code location pointer, the processor responsive to said program mode designation by said program mode designator and the reception by said receiver of said second radio frequency transmission for storing a second stored code corresponding to the second radio frequency transmitter in another of said plurality of storage locations derived from the processor controlled code location pointer, and the processor responsive to an operate mode and the reception of said first-mentioned radio frequency transmission after the storage of said first stored code for moving the barrier and responsive to said operate mode and to the reception of said second radio frequency transmission after the storage of said first and said second stored codes for moving said barrier.*

*6. An operator for controlling a position of a barrier according to claim 5 wherein said processor controlled code location comprises a software controlled code location pointer.*

*7. An operator for controlling a position of a barrier according to claim 5 wherein the processor comprises a microprocessor.*

*8. A system for controlling a position of a barrier comprising:*

*a first radio frequency transmitter having a first non-user changeable code and for radio frequency transmitting a first radio frequency transmission corresponding to the first transmitter;*

*a second radio frequency transmitter having a second non-user changeable code, different from said first non-user changeable code and for radio frequency transmitting a second radio frequency transmission corresponding to the second transmitter; and*

*an operator for controlling a position of a barrier, said operator comprising:*

*a radio frequency receiver for receiving said first and said second radio frequency transmissions;*

*a program mode designator for designating a program mode;*

*a memory comprising a plurality of storage locations;*

*a processor having a processor controlled code location pointer and responsive to a program mode designation by said program mode designator and the reception by said radio frequency receiver of said first radio frequency transmission for storing a first stored code corresponding to the first radio frequency transmitter in one of said plurality of storage locations derived from the processor controlled code location pointer, the processor responsive to said program mode designation by said program mode designator and the reception by said receiver of said second radio frequency transmission for storing a second stored code corresponding to the second radio frequency transmitter in another of said plurality of storage locations derived from the processor*

*controlled code location pointer, and the processor responsive to an operate mode and the reception of said first radio frequency transmission after the storage of said first stored code for moving the barrier and responsive to said operate mode and to the reception of said second radio frequency transmission after the storage of said first and said second stored codes for moving said barrier.*

*9. A system for controlling a position of a barrier according to claim 8 wherein the processor comprises a microprocessor.*

*10. A system for controlling a position of a barrier comprising:*

*a first radio frequency transmitter having a first non-user changeable code and for radio frequency transmitting a first radio frequency transmission corresponding to the first transmitter;*

*a second radio frequency transmitter having a second non-user changeable code, different from said first non-user changeable code and for radio frequency transmitting a second radio frequency transmission corresponding to the second transmitter; and*

*an operator for controlling a position of a barrier, said operator comprising:*

*a radio frequency receiver for receiving said first and said second radio frequency transmissions;*

*a program mode designator for designating a program mode;*

*a memory comprising a plurality of storage locations;*

*a processor having a software controlled code location pointer and responsive to a program mode designation by said program mode designator and the reception by said radio frequency receiver of said first radio frequency transmission for storing a first stored code corresponding to the first radio frequency transmitter in one of said plurality of storage locations derived from the processor controlled code location pointer, the processor responsive to said program mode designation by said program mode designator and the reception by said receiver of said second radio frequency transmission for storing a second stored code corresponding to the second radio frequency transmitter in another of said plurality of storage locations derived from the software controlled code location pointer, and the processor responsive to an operate mode and the reception of said first radio frequency transmission after the storage of said first stored code for moving the barrier and responsive to said operate mode and to the reception of said second radio frequency transmission after the storage of said first and said second stored codes for moving said barrier.*

*11. A system for controlling a position of a barrier according to claim 10 wherein the processor comprises a microprocessor.*

*12. A garage door operator for a garage door comprising, a garage door operation mechanism with an output shaft connected to said garage door to open and close it, a radio receiver, a decoder connected to receive the output of said radio receiver, a microprocessor connected to receive the output of said decoder and to said garage door operation mechanism to energize it, a switch moveable between operate and program positions connected to said microprocessor to place said microprocessor in the program mode, memory means for storing a plurality of addresses connected to said microprocessor when said switch is in the program position, a memory selector for selecting respective storage addresses in the memory means, a plurality of radio transmitters with different non-user changeable codes, said memory selector pointing to a first storage address at a time when a first one of said radio transmitters is energized so that the code of said first transmitter will be stored in said memory means in said first address and said memory selector pointing to a second storage address at a time when a second one of said radio transmitters is energized so that the code of said second transmitter will be stored in said memory means in said second address, and said microprocessor placed in the operate mode when said switch is in the operate position so that either of said first and second radio transmitters when energized cause said microprocessor to energize said garage door operator mechanism.*

*13. A garage door operator for a garage door according to claim 12, wherein said first and second radio transmitters when energized radiate coded signals and said microprocessor receives and compares coded signals from said first and second transmitters with coded signals stored in said memory means and said microprocessor produces a garage door operate signal if the received transmitted signal and any one of said coded signals stored in said memory means match.*

*14. A garage door operator according to claim 12 wherein said memory selector has "n" positions where "n" is an integer an the codes of "n" transmitters can be stored in said memory means when said switch is in the program mode.*

*15. A garage door opener according to claim 12 wherein the code stored in said memory means can be changed by placing said switch in the program mode and one of said plurality of transmitters is energized which has a code which differs from the code previously stored in said memory means.*

*16. A garage door operator according to claim 12 wherein the memory selector comprises a software controlled code location pointer identifying a memory address.*

*17. An operator for controlling operation of equipment comprising:*

*a radio receiver, a decoder connected to receive the output of said radio receiver, a microprocessor connected to receive the output of said decoder and to said equipment to energize it, switch means for selection between operate and program positions connected to said microprocessor to place said microprocessor in the program mode, memory means for storing a plurality of addresses connected to said microprocessor when said switch means is in the program position, memory selection means for selecting respective storage addresses in the memory, a plurality of radio transmitters with different non-user changeable codes, said memory selection means being adapted to select a first storage location at a time when a first one of said radio transmitters is energized so that the code of said first transmitter will be stored in said memory means in the first location and said memory selection means being adapted to select a second storage location at a time when a second one of said radio transmitters is energized so that the code of said second transmitter will be stored in said memory means in said second location, and said microprocessor placed in the operate mode when said switch means is in the operate position so that either of said first and second radio transmitters, when energized cause said microprocessor to energize said equipment.*

*18. An operator according to claim 17 wherein said first and second radio transmitters when energized radiate coded*

*signals and said microprocessor receives and compares coded signals from said first and second transmitters with coded signals stored in said memory means and said microprocessor produces an operate signal if the received transmitted signal and any one of said coded signals stored in said memory means match.*

*19. An operator according to claim 17 wherein said memory selection means has "n" states where "n" is an integer and the codes of "n" transmitters can be stored in said memory means when said switch means is in the program mode.*

*20. An operator according to claim 17 wherein the code stored in said memory means can be changed by placing said switch means in the program mode and one of said plurality of transmitters is energized which has a code which differs from the code previously stored in said memory means.*

*21. An operator according to claim 17 wherein the memory selection means comprises a software controlled code location pointer identifying a memory address.*

*22. A garage door operator according to claim 21 wherein the microprocessor increments the code location pointer to select the memory addresses to store the respective transmitter codes.*

*23. A garage door operator for a garage door comprising:*

*a garage door operation mechanism with an output shaft connected to said garage door to open and close it;*

*a plurality of RF transmitters, each of said transmitters having its own different non-user changeable transmitter code and having means for transmitting when energized, an RF signal carrying a code from which the transmitter code can be derived;*

*a receiver for receiving said coded RF transmissions;*

*a decoder for deriving a code corresponding to the transmitter code in the energized transmitter;*

*processor means for providing in its operate mode an operating signal to said garage door operation mechanism to energize it and for providing in its program mode a derived code for storage;*

*mode selection means connected to said processor means for placing said processor means in its program mode;*

*memory means having a plurality of addresses for storing a plurality of derived codes under the control of said processor means;*

*memory selection means controlled by said processor means for identifying respective ones of the memory addresses;*

*said memory selection means identifying one of the memory addresses so that the processor means, when in its program mode, causes the derived code of one of the transmitters to be stored in said memory means at the one memory address, and said memory selection means identifying a second memory address so that the processor means, when in its program mode, causes the derived code of a second transmitter to be stored in said memory means at the second memory address;*

*said processor means, when in its operate mode, determining whether the derived code and one of the stored codes correspond, said processor means providing an operating signal to energize said garage door operator mechanism upon correspondence.*

*24. A garage door operator for a garage door in accordance with claim 23, wherein the processor means determines whether the derived code has been previously stored in any of the memory locations and if the derived code is already stored, the processor means does not cause the derived code to be stored.*

*25. A garage door operator for a garage door in accordance with claim 23, wherein if a derived code is stored in all the available storage locations, the memory selection means will select one of such storage locations and the processor means causes the derived code to be stored in that location.*

*26. A garage door operator for a garage door in accordance with claim 23, wherein means are provided to prevent the processor means from energizing the garage door operator mechanism until the processor means determines that the derived code corresponds with the stored code a preset plurality of times.*

*27. A garage door operator for a garage door in accordance with claim 23, wherein means are provided to prevent the processor means from storing a derived code until the same derived code is received a preset plurality of times.*

*28. A garage door operator for a garage door according to claim 23 wherein said processor means comprises a microprocessor.*

*29. A garage door operator comprising:*

*a garage door operation mechanism with an output shaft connected to said garage door to open and close it;*

*a plurality of RF transmitters, each of said RF transmitters having its own different, non-user changeable transmitter code and having a transmitter for transmitting when energized, an RF signal carrying a code from which the transmitter code can be derived;*

*a receiver for receiving said coded RF transmissions;*

*a decoder for deriving a code corresponding to the transmitter code of the energized transmitter;*

*a processor for providing in its operate mode an operating signal to said garage door operation mechanism to energize it;*

*a mode selector connected to said processor for placing said processor in its program mode;*

*an addressable memory having a plurality of addresses controlled by said processor for storing a plurality of derived codes;*

*a software controlled memory selector controlled by said processor for identifying respective ones of the memory addresses;*

*said software controlled memory selector identifying one of the memory addresses so that the processor, when in its program mode, causes the derived code of one of the transmitters to be stored in said addressable memory at the one memory address, and said software controlled memory selector identifying another memory address so that the processor, when in its program mode, causes the code of a second transmitter to be stored in said addressable memory at the memory address;*

*said processor, when in its operate mode, determining whether the derived code corresponds with at least one of the second codes and when there is correspondence said processor providing an operating signal to energize said garage door mechanism.*

*30. A garage door operator according to claim 29 wherein the processor comprises a microprocessor.*

* * * * *

UNITED STATES PATENT AND TRADEMARK OFFICE

CERTIFICATE OF CORRECTION

PATENT NO. : Re. 36,703
DATED : May 16, 2000
INVENTOR(S) : Heitschel et al.

It is certified that error appears in the above-identified patent and that said Letters Patent is hereby corrected as shown below:

At column 1, line 25, change "08/425,725" to --08/425,724--.
At column 1, line 26, change "4,750,188" to --4,750,118--.
At column 8, line 26, change "an" to --and--.
At column 10, line 60, change "second" to --stored--.

Signed and Sealed this

Twenty-fourth Day of April, 2001

*Attest:*

Nicholas P. Godici

NICHOLAS P. GODICI

*Attesting Officer*

*Acting Director of the United States Patent and Trademark Office*

UNITED STATES PATENT AND TRADEMARK OFFICE

CERTIFICATE OF CORRECTION

PATENT NO. : RE 36,703
DATED : May 16, 2000
INVENTOR(S) : Carl Heitschel et al.

It is certified that error appears in the above-identified patent and that said Letters Patent is hereby corrected as shown below:

Column 1,
Line 12, under "CROSS-REFERENCES TO RELATED APPLICATIONS", insert the following:

-- Notice: More than one reissue application has been filed for the reissue of patent 4,750,118. The reissue applications are 09/504,146, 08/700,610, and 08/425,724. --

Signed and Sealed this

Ninth Day of April, 2002

*Attest:*

*Attesting Officer*

JAMES E. ROGAN
*Director of the United States Patent and Trademark Office*